No. 713,364. Patented Nov. 11, 1902.
W. L. UHLENHART.
ILLUMINATING BUOY FOR FISH NETS.
(Application filed Mar. 19, 1902.)
(No Model.)
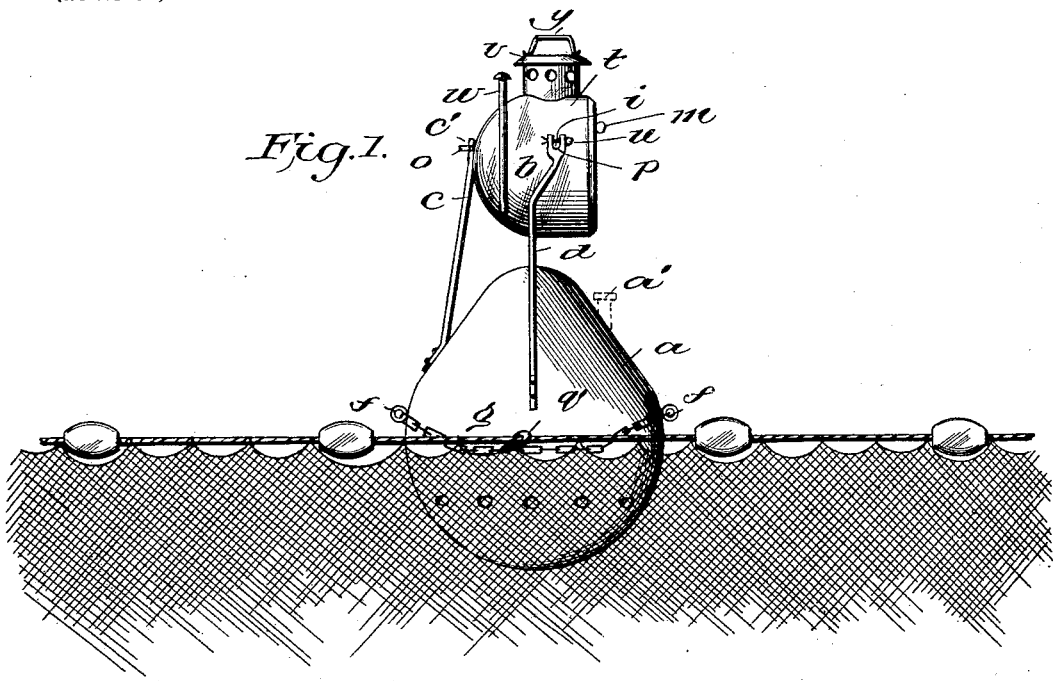
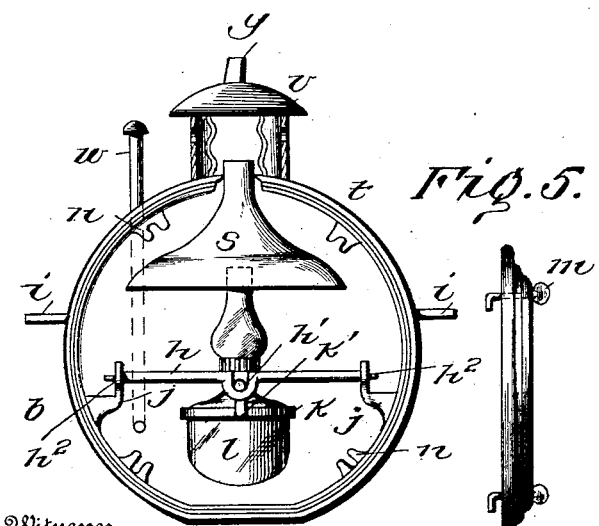
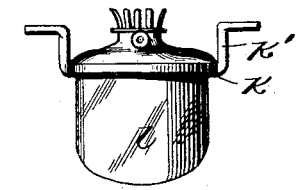
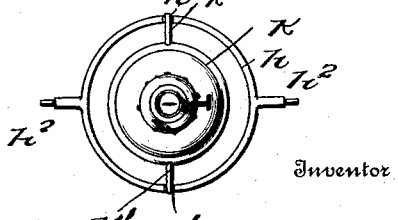
Inventor
W. L. Uhlenhart
Attorney
THE NORRIS PETERS CO., PHOTO-LITHO., WASHINGTON, D. C.

UNITED STATES PATENT OFFICE.

WILLIAM LUDEWIG UHLENHART, OF PORTLAND, OREGON.

ILLUMINATING-BUOY FOR FISH-NETS.

SPECIFICATION forming part of Letters Patent No. 713,364, dated November 11, 1902.

Application filed March 19, 1902. Serial No. 99,007. (No model.)

*To all whom it may concern:*

Be it known that I, WILLIAM LUDEWIG UHLENHART, a citizen of the United States, and a resident of Portland, in the county of Multnomah and State of Oregon, have invented a new and useful Illuminating-Buoy for Fish-Nets, of which the following is a specification, reference being had to the accompanying drawings as constituting a part thereof.

It has been discovered that fish are attracted by a light caused to shine upon the surface of the water; and it is the object of my invention to turn this fact to practical account in connection with fishing with nets—such as gill-nets, for example—that is to say, to aid the fisherman in his work by attracting the fish to his net. Incidentally my invention is an efficient means for marking the location of the net, so as to enable vessels passing in its vicinity to clear the same, and, furthermore, it is a protection to the fisherman in keeping away thieves, for since the latter are obliged to ply their nefarious occupation under cover of darkness by illuminating the net they would not deem it safe, for their thieving, if attempted, would be exposed to the fishermen in their boats in the vicinity of the net.

To carry my object into effect, I have invented the combination of devices illustrated in the drawings above referred to, the same operating as will be hereinafter fully described and claimed.

In the drawings, Figure 1 shows a part of a gill-net and a buoy secured to the cork-line of such gill-net and supporting a lamp-case, the buoy being so attached to the gill-net as to cause the light to be reflected in the direction in which the net is drifting with the current. Fig. 2 is an elevation of the lamp-case removably supported on the buoy, as shown in Fig. 1, the glass front of the lamp-case being removed. Fig. 3 is a detail showing the central ring $k$, pivotally supported within the ring $h$, pivotally supported in forked bearings within the reflector, as shown in Fig. 2. Fig. 4 is a plan of the swinging bearings for the lamp $l$, and Fig. 5 is a detail showing in end elevation the removable glass front provided with turn-keys $m$, to be locked in slotted lugs $n$, provided in the lamp-casing, so as to secure the glass front in place.

The letters designate the parts referred to throughout the several views.

The buoy $a$ may be made of the well-known construction, in which the lower part is divided from the upper by a partition and has perforations in the base of the outer wall to admit and discharge again the water which constitutes the ballast for the buoy and maintains the same in an upright position. On opposite sides the buoy is provided with rings $f$, to which to attach a suitable chain provided with a snap-ring $q$ or other catch for fastening the buoy to the cork-line of the net, as shown in Fig. 1. However the particular means employed for fastening the buoy to the net is not material.

Projecting upwardly from the buoy are three standards $c$ and $d$, the same constituting a tripod for supporting the lamp-casing $b$. The lamp-casing has laterally-projecting trunnions $i$ and a rearwardly-projecting stud $o$. The standard $c$ is provided at its upper extremity with an eye $c'$, in which to receive the stud $o$. The standards $d$ are bent forward at their upper extremities and provided with a fork $p$, in which to receive the trunnions $i\ i$ of the lamp-case. In placing the lamp-case in its said support the stud $o$ is first inserted in the eye $c'$ of the standard $c$, and then the trunnions $i\ i$ are placed in the forks of the standards $d$. To prevent the lamp-case from being lifted out of its said support by waves, the trunnions $i\ i$ may be locked in place by means of split pins $u$. The lamp-case $b$ is provided in its interior with a reflector, or the interior surface of the lamp-case may be finished bright, so as to serve the purpose of a reflector. The reflecting-surface in either case must be adapted to reflect the light along the water-surface.

$s$ is a bell to carry off the heated air from the interior of the lamp-case. The top of the bell $s$ projects through the roof of the lamp-case into the cylindrical turret $v$, having air-apertures in its sides, allowing an escape of the heated air. The cool air is admitted into the lamp-case through an air-shaft $w$, consisting of a pipe attached to the exterior of the lamp-case, the lower end opening into the bottom part of the lamp-case and the upper end being provided with a cap to keep out the water.

$l$ represents the lamp. It is supported by a ring $k$, having upwardly-extending portions $k'$, by which the ring $k$ is pivotally supported in the sockets $h'$ of the outer ring $h$, having trunnions $h^2$ pivotally seated in forked brackets $j$, provided on the interior of the lamp-casing. Thus with the described support for the lamp the latter will be substantially retained in an upright position, notwithstanding the oscillations of the buoy and lamp-case, and, furthermore, the flame of the lamp is also maintained approximately within the center of the reflector. The cover for the open front of the lamp-case consists of an annular frame $t$, provided with a glass or transparent material in the usual manner, and the said frame is provided with turn-keys $m$, to be inserted in the slotted lugs $n$, so as to secure the glass cover of the lamp-case in place.

To make a water-tight closure for the frame of the glass front, the rim of the lamp-case is recessed to hold a gasket or packing-ring, against which said frame of the transparent front is jammed when locked in place by the turn-keys $m$.

$y$ is a handle provided as a convenience for lifting the lamp-case off its support on the buoy.

My invention may also be especially adapted for locating the net by the use of three illuminating-buoys, the center one being a white light and the end illuminating-buoys being provided with red and green glass fronts, so as to mark the port and starboard ends of the net as are the sides of a vessel. The number of illuminating-buoys to be used depends upon the length of the net. They should be placed approximately about four hundred feet apart.

The means for supplying the light while shown as an oil-lamp may be any lighting means as found convenient and expedient for the purpose intended by me. Also instead of making the buoy of the construction above described the same may be made in the form of a hollow vessel, having an inlet, as indicated by $a'$ in dotted outline, in which to fill the required quantity of water to ballast the buoy.

Having fully described my invention, now what I claim, and desire to secure by Letters Patent, is—

1. The combination with a fishing-net of a buoy having upright standards, a lamp-case removably supported by said standards, said lamp-case comprising reflector means; a swinging bracket pivotally supporting a lamp within the lamp-case, said swinging bracket being adapted to maintain the lamp in a perpendicular position notwithstanding the oscillations of the buoy, and also to constantly maintain the flame of the lamp within the focal center of the reflector, for throwing the rays of the light ahead, as set forth; and means for removably securing the buoy to the net, substantially as described.

2. The combination with a fishing-net, of a buoy having upright standards, $c$, $d$, the lamp-case, $b$, having lugs, or trunnions, $i$, $i$, and stud, $o$, whereby it is removably supported in forked ends of said standards; said lamp-case comprising reflector means, brackets, $j$, $j$, rings $h$ and $k$, pivotally supporting a lamp, said rings being adapted to maintain the flame in a perpendicular position notwithstanding the oscillations of the buoy, and also to constantly maintain the flame of the lamp within the focal center of the reflector for throwing the rays of the light ahead, as set forth; and means for removably securing the buoy to the net, substantially as described.

In testimony whereof I have hereunto affixed my signature, in the presence of two witnesses, this 7th day of March, 1902.

WILLIAM LUDEWIG UHLENHART.

Witnesses:
T. J. GEISLER,
J. C. MARTIN.